United States Patent
Nehls

(10) Patent No.: US 10,203,000 B2
(45) Date of Patent: Feb. 12, 2019

(54) LOCKING WASHER FOR BRACE MEMBERS

(71) Applicant: UNISTRUT INTERNATIONAL CORPORATION, Harvey, IL (US)

(72) Inventor: Charles O. Nehls, Allen Park, MI (US)

(73) Assignee: UNISTRUT INTERNATIONAL CORPORATION, Harvey, IL (US)

( * ) Notice: Subject to any disclaimer, the term of this patent is extended or adjusted under 35 U.S.C. 154(b) by 0 days.

(21) Appl. No.: 15/354,071

(22) Filed: Nov. 17, 2016

(65) Prior Publication Data
US 2017/0175800 A1 Jun. 22, 2017

Related U.S. Application Data

(60) Provisional application No. 62/269,492, filed on Dec. 18, 2015.

(51) Int. Cl.
| | | |
|---|---|---|
| *F16B 43/00* | (2006.01) | |
| *F16M 13/02* | (2006.01) | |
| *F16B 7/18* | (2006.01) | |
| *F16B 2/12* | (2006.01) | |

(52) U.S. Cl.
CPC .............. *F16B 43/00* (2013.01); *F16B 7/187* (2013.01); *F16M 13/027* (2013.01); *F16B 2/12* (2013.01)

(58) Field of Classification Search
USPC ............ 411/86, 161, 531, 104; 248/58, 68.1
See application file for complete search history.

(56) References Cited

U.S. PATENT DOCUMENTS

| | | | | |
|---|---|---|---|---|
| 291,202 | A * | 1/1884 | Koch ............................ | 411/531 |
| 3,059,589 | A * | 10/1962 | Schreyer ................ | B65G 21/00 |
| | | | | 104/111 |
| 4,627,593 | A * | 12/1986 | Salter .................... | F16L 3/2053 |
| | | | | 248/561 |
| 4,950,099 | A * | 8/1990 | Roellin ................ | B62D 33/044 |
| | | | | 403/348 |
| 5,924,685 | A * | 7/1999 | Webb ...................... | B25B 5/163 |
| | | | | 269/228 |
| 6,521,837 | B2 * | 2/2003 | Hilgert ................. | H01R 25/162 |
| | | | | 174/149 B |
| 7,070,374 | B2 * | 7/2006 | Womack ............... | B60P 7/0815 |
| | | | | 410/104 |
| 7,073,995 | B2 * | 7/2006 | Herb ...................... | F16B 37/046 |
| | | | | 411/104 |
| 7,389,621 | B2 * | 6/2008 | Hawes .................... | E04C 3/005 |
| | | | | 52/647 |
| 8,277,158 | B2 * | 10/2012 | Csik ...................... | F16B 37/046 |
| | | | | 411/111 |

(Continued)

*Primary Examiner* — Gary W Estremsky

(57) ABSTRACT

Embodiments of the present disclosure provide an apparatus including a washer coupled to a strut, the strut including an interior channel, an opening formed through an end wall, and a set of turned-in ends, wherein the washer includes an engagement surface having a set of protrusions for engaging a surface of the strut. The apparatus further includes a fastener for securing the washer to the strut, the fastener having an opening for receiving support therein. In some embodiments, the protrusions are teeth that drive into the strut material when torqued, resulting in a mechanical connection with the strut and much higher slip resistance. Further, the washer is shaped to fit around an outside of the strut, thus adding additional stability and load capacity.

18 Claims, 7 Drawing Sheets

(56) References Cited

U.S. PATENT DOCUMENTS

| | | | |
|---|---|---|---|
| 8,505,864 B1* | 8/2013 | Taylor | F24J 2/5258 |
| | | | 248/226.12 |
| 8,827,255 B2* | 9/2014 | Woods | B25B 5/163 |
| | | | 269/120 |
| 8,931,232 B2* | 1/2015 | Kelly | F16B 43/00 |
| | | | 411/368 |
| 9,689,411 B2* | 6/2017 | Meine | F16B 2/12 |
| 2005/0129458 A1* | 6/2005 | Hoffmann | F16B 7/187 |
| | | | 403/256 |
| 2015/0233410 A1* | 8/2015 | Parthibhan | F16B 37/046 |
| | | | 411/85 |

\* cited by examiner

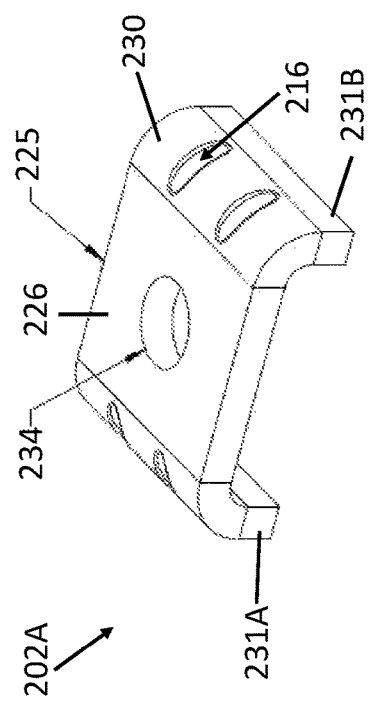
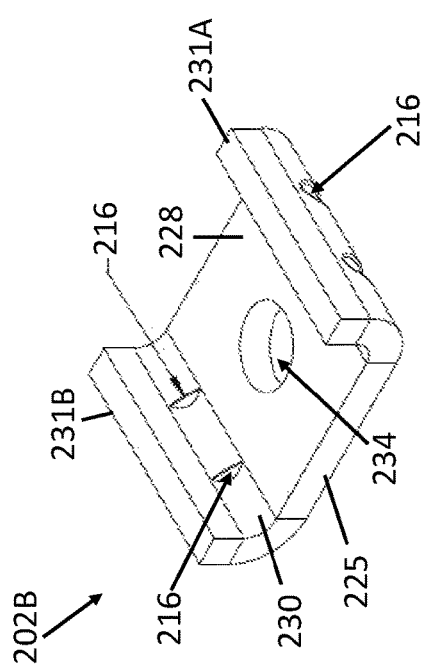
FIG. 2A
FIG. 2B

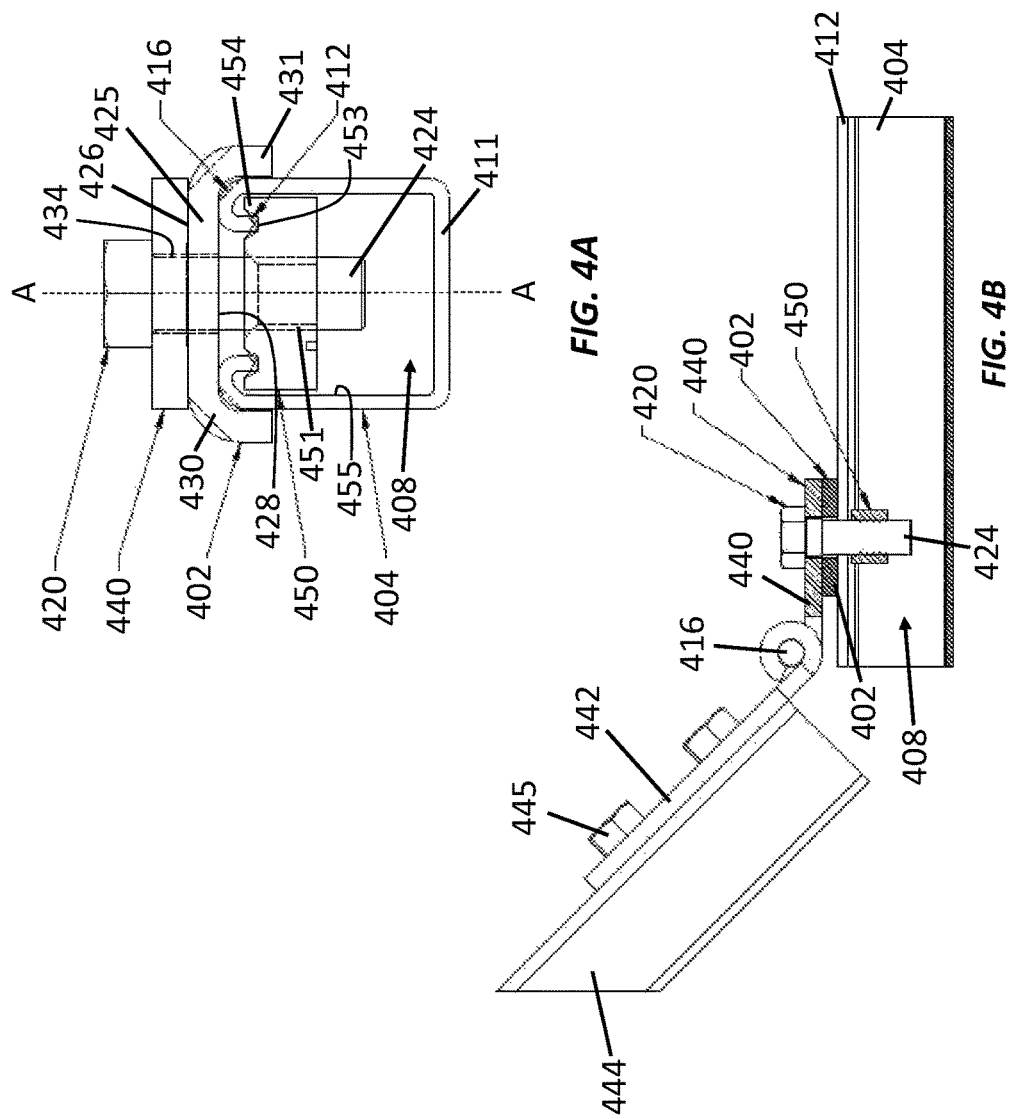

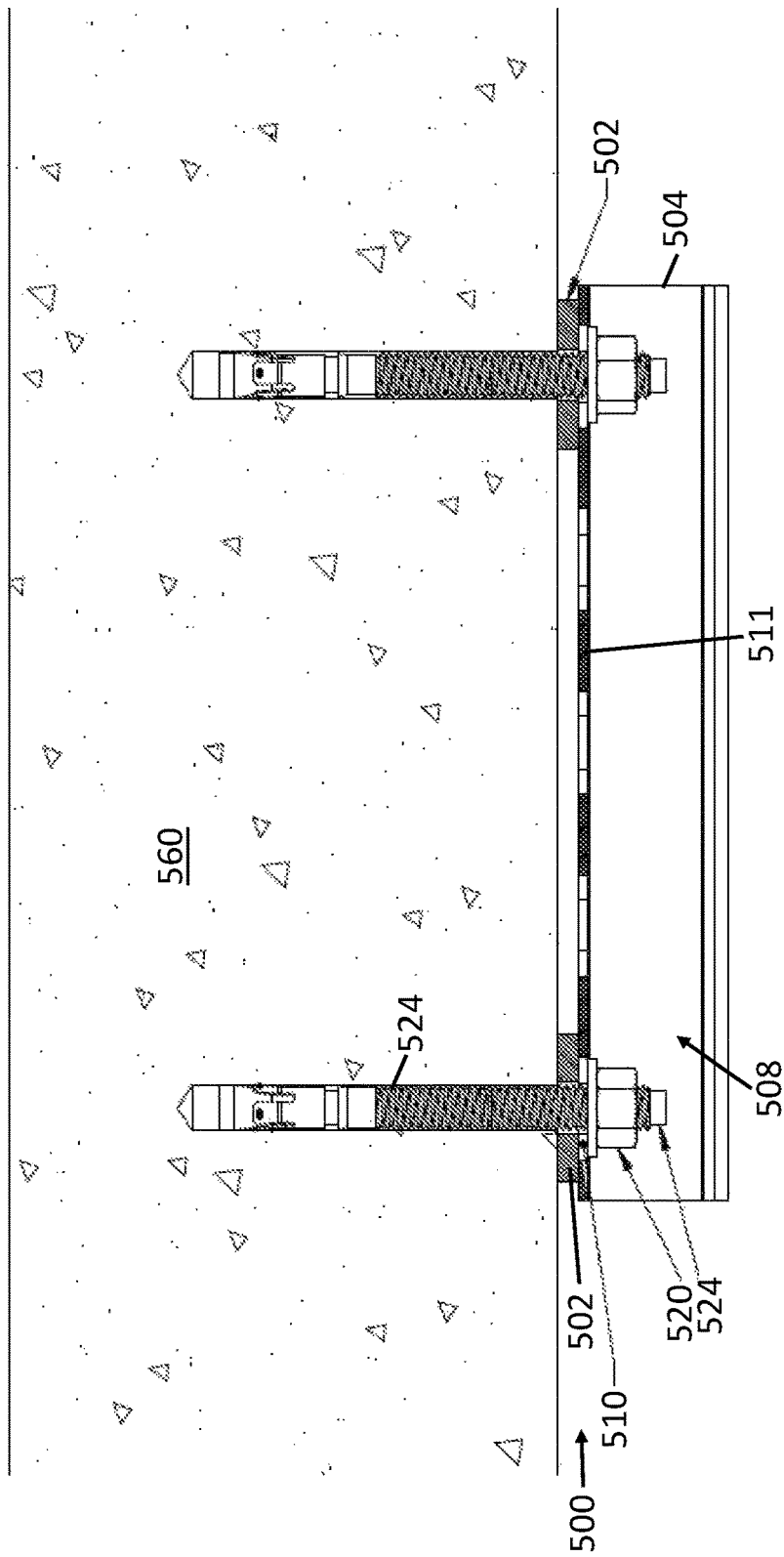

LOCKING WASHER FOR BRACE MEMBERS

CROSS-REFERENCE TO RELATED APPLICATION

This is a non-provisional of pending U.S. provisional application Ser. No. 62/269,492, filed Dec. 18, 2015, the entirety of which application is incorporated by reference herein.

FIELD OF THE DISCLOSURE

The present embodiments relate generally to adapters for converting a slot in a strut and, more particularly, to a slot adapter having a mechanical connection to increase slip resistance.

BACKGROUND OF THE DISCLOSURE

Channel members are used as support structures and bracing elements in a variety of applications and industries. Channel members may be produced in a variety of sizes and steel gages depending on the application. Frequently, channel members are formed with holes or slots to facilitate securing sections of one channel member with another channel member, and for securing the channel member to walls and other structures or appurtenances using, for example, threaded rods, washers, nuts and the like. In one approach, an end of a threaded rod can be inserted through a slot in the channel member whereupon a washer and nut are secured to the end thereof. The washer and nut prevent the rod from being withdrawn through the slot in the channel member. The rod can be used to support the channel member from an overhead structure, or it can be used to support an object below. A variety of fittings can be used with channel members to create complex support structures to suit a particular application.

Different types of connectors/adapters are used for connecting together multiple struts. Depending the construction, it may be necessary to convert a slot in a piece of strut to a hole. Current slot adapter designs couple to the strut, relying purely on friction for slip resistance. Other designs nest into the slot itself, which doesn't allow the hole to be positioned anywhere along the length of the slot and/or strut.

SUMMARY OF THE DISCLOSURE

Embodiments of the present disclosure provide an apparatus including a washer coupled to a strut, the strut including an interior channel, an opening, and a set of turned-in ends, wherein the washer includes an engagement surface having a set of protrusions for engaging a surface of the strut. The apparatus further includes a fastener for securing the washer to the strut, the fastener having an opening for receiving support therein. In some embodiments, the protrusions are teeth that drive into the strut material when torqued, resulting in a mechanical connection with the strut and much higher slip resistance. Further, the washer is shaped to fit around an outside of the strut, thus adding additional stability and load capacity when used with the strut.

In one embodiment, an assembly includes a washer coupled to a strut, the strut including an interior channel, an opening formed through an end wall, and a set of turned-in ends. The washer may include an engagement surface having a set of protrusions for engaging a surface of the strut. The assembly further includes a fastener for securing the washer to the strut, wherein the fastener has an opening for receiving a support therein, and wherein the support extending through the interior channel and the opening formed through the end wall.

In another embodiment, a brace assembly includes a washer secured to a strut, the strut including an interior channel, an opening, and a set of turned-in ends, wherein the washer includes an engagement surface having a set of protrusions for engaging a surface of the strut. The brace assembly further includes a fastener for securing the washer to the strut, the fastener having an opening for receiving a support therein.

In yet another embodiment, a brace assembly includes a washer secured to a strut, the strut including an interior channel, an opening formed through an end wall, and a set of turned-in ends. The brace assembly further includes a fastener for securing the washer to the strut, the fastener having an opening for receiving a support therein, the support extending through the interior channel and the opening formed through the end wall. The washer may include a central section having a top surface in contact with the fastener, an inner surface opposite the top surface, the inner surface in contact with the strut, a curved engagement surface extending from the inner surface, wherein a set of protrusions is formed along the curved engagement surface, and a free end extending from the curved engagement surface, the free end oriented substantially perpendicular to the central section.

BRIEF DESCRIPTION OF THE DRAWINGS

FIGS. 2A-B show perspective views of a washer of the apparatus/assembly of FIGS. 1A-B for securing brace members together in accordance with certain aspects of the present disclosure.

FIGS. 4A-B show perspective views of an apparatus for securing brace members together in accordance with certain aspects of the present disclosure.

FIGS. 5A-B show perspective views of an apparatus for securing a strut to a structure in accordance with certain aspects of the present disclosure.

Figures 1A, 1B:
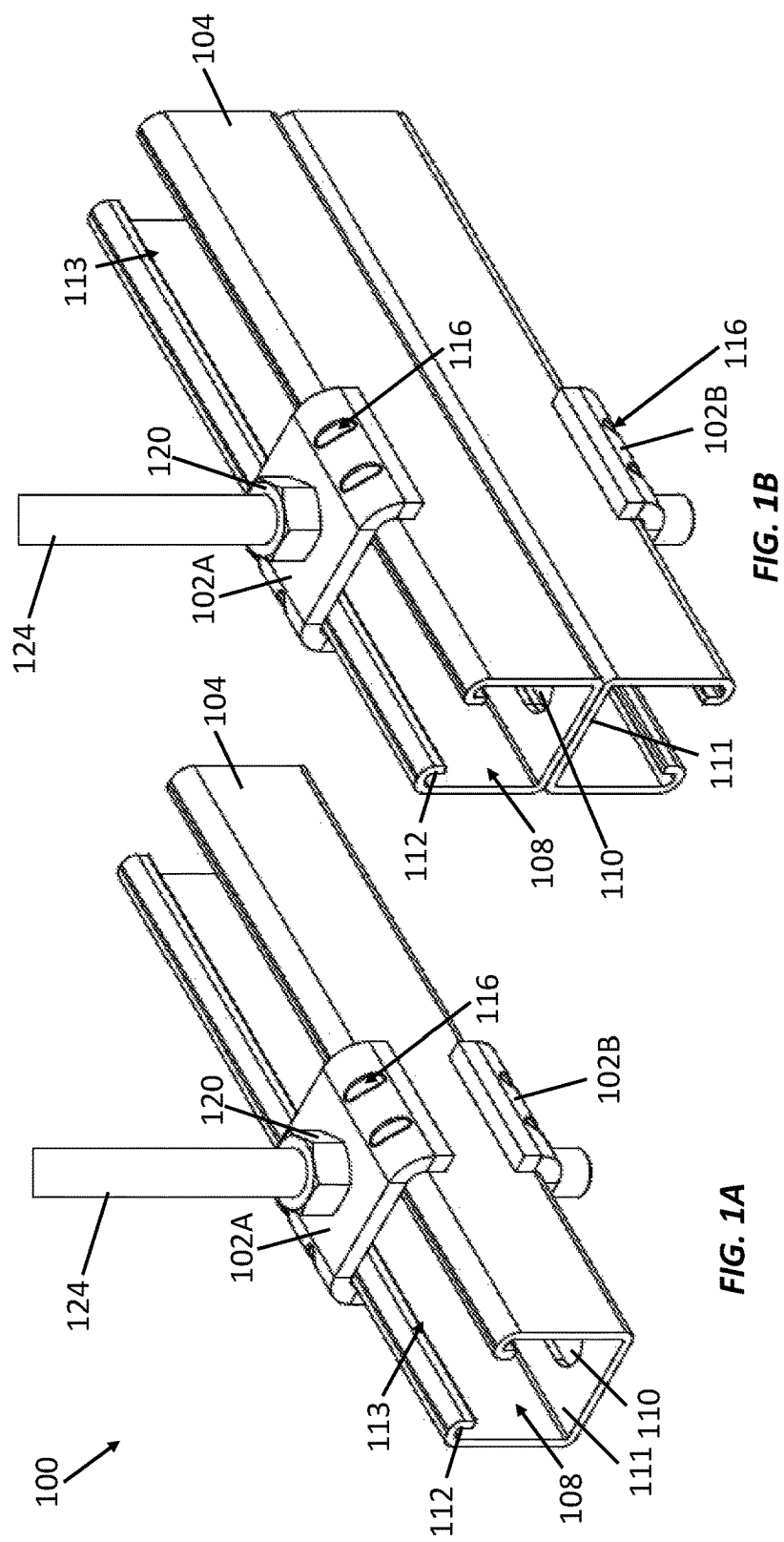
FIGS. 1A-B show perspective views of an apparatus/assembly for securing brace members together in accordance with certain aspects of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now be described more fully hereinafter with reference to the accompanying drawings, where embodiments of the retrofit brace fitting assembly are shown. The apparatuses described herein may be embodied in many different forms and is not to be construed as being limited to the embodiments set forth herein. Instead, these embodiments are provided so this disclosure will be thorough and complete, and will fully convey the scope of the apparatus to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, each with respect to the geometry and orientation of a component of the retrofit brace fitting assembly as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

As further described embodiments of the present disclosure provide an apparatus including a washer coupled to a strut, the strut including an interior channel, an opening, and a set of turned-in ends, wherein the washer includes an engagement surface having a set of protrusions for engaging a surface of the strut. The apparatus further includes a fastener for securing the washer to the strut, the fastener having an opening for receiving a support therein. In some embodiments, the protrusions are teeth that drive into the strut material when torqued, resulting in a mechanical connection with the strut and much higher slip resistance. Further, the washer is shaped to fit around an outside of the strut, thus adding additional stability and load capacity when used with the strut.

In exemplary embodiments, the washer has a clevis-shaped body configured to fit around the strut, and can often be used in pairs, as further described below. The clevis shape creates a solid connection with at least three (3) sides of the strut. Multiple teeth formed into the body of the washer will drive into, and penetrate, the strut when the hex nuts or fastener is tightened to its specified torque. These teeth create a strong mechanical connection with the strut, which is greater than a pure surface friction connection. This results in a high "slip resistance", which is the resistance of the locking clevis-shaped washer and any other attached fitting or hardware to slip along the length of the strut. Further, since the washer does not engage with the geometry of a strut slot, it is able to be positioned anywhere along the length of the strut to allow the threaded rod or fastener to pass through.

Turning now to FIGS. 1A-B, a brace apparatus or assembly 100 according to various embodiments of the disclosure will be described in greater detail. As shown, the assembly 100 includes one or more washers 102A-B disposed on opposites sides (e.g., top and bottom) of a brace member such as a strut 104, which may be a unitary strut, as shown in FIG. 1A, or a double strut, as shown in FIG. 1B. Each washer 102A-B has a set of protrusions 116 (e.g., teeth) for engaging a surface of the strut, as will be explained in greater detail below. The strut 104 may be a generally U-shaped brace member including an interior channel 108, an opening 110 (e.g., a slot) formed through an end wall 111, and a set of turned-in ends 112 at an open side 113 thereof. In the case multiple struts 104 are combined, such as shown in FIG. 1B, the end walls 111 of each strut 104 may be provided directly adjacent one another. However, it'll be appreciated that a variety of configurations are possible in different embodiments.

The assembly 100 further includes one or more fasteners 120 (e.g., a hexagonal nut, a clamp, a hub assembly) for securing the washers 102A-B to the strut 104. Each fastener 120 has an opening 234 (FIGS. 2A-B) formed therein for receiving a support 124, such as a threaded rod or bolt. In an exemplary embodiment, the fastener 120 is a nut and the support 124 is a rod, and internal threading of the nut is matingly engaged with external threading of the rod to secure a position of the nut relative to the rod. As shown, the support 124 extends through the washer 102A on one side of the strut 104, passes through the interior channel 108, and continues through the washer 102B on the opposite side of the strut 104.

Turning now to FIGS. 2A-B, an exemplary washer according to embodiments of the disclosure will be described in greater detail. As shown, the washers 202A-B each have a clevis shaped body including a flat central section 225 having a top surface 226, an inner surface 228, and a curved engagement surface 230 having the set of protrusions 216 formed thereon. The washers 202A-B further include first and second free ends 231 oriented perpendicular, or substantially perpendicular, to the central section 225. As shown, the washers 202A-B are shaped to fit around an outside of the strut, thus adding additional stability and load capacity when used with the strut. To further enhance engagement between the washers 202A-B and the strut 204, the set of protrusions 216 include a set of teeth extending from the inner surface 228 of the washer 102. Each of the teeth may include a sharpened edge or surface that penetrates and slightly deforms an exterior surface of the strut 204 to increase a mechanical connection between the washers 202A-B and the strut 204.

Figure 3A:
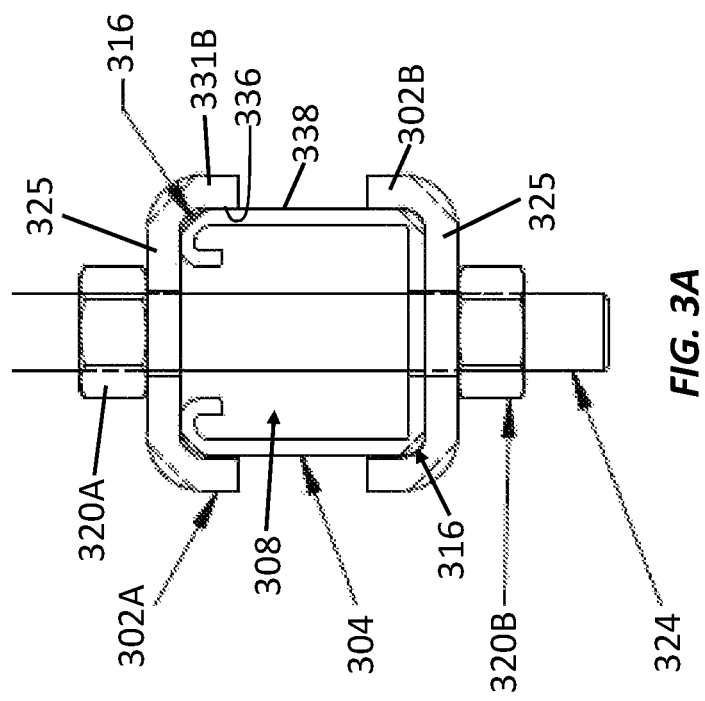
FIGS. 3A-B show side views of the washer of the apparatus/assembly of FIGS. 1A-B for securing brace members together in accordance with certain aspects of the present disclosure.
Figure 3B:
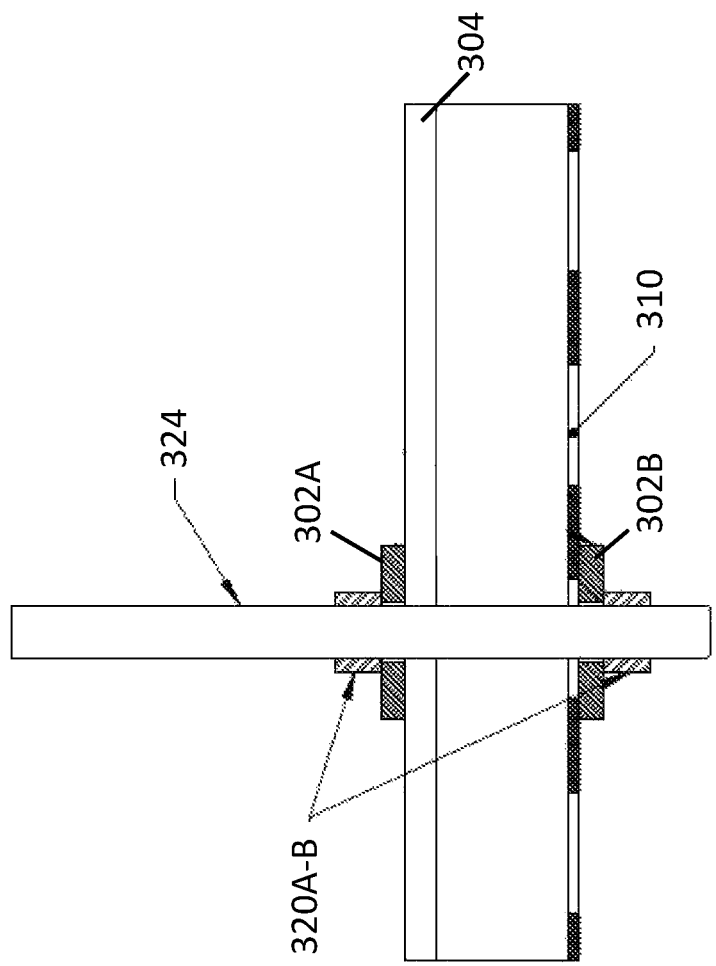

As shown in FIGS. 3A-B, an inner surface 336 of the free ends 331 of the washers 302A-B extends substantially perpendicularly to a plane defined by the top surface 326 of the washers 302A-B, such that the inner surface 336 abuts an outer surface 338 of the strut 304. As arranged, the curved engagement surface 330 and the free ends 331 engage the strut to prevent rotation of the washers 302A-B relative to the strut 304. The fasteners 320A-B further enhance this connection by applying a force to the support 324 and to each respective washer 302A-B, which biases the washers 302A-B towards one another along a lengthwise axis of the support 324.

Turning now to FIGS. 4A-B, another apparatus/assembly according to embodiments of the disclosure will be described in greater detail. The assembly 400 includes one or more washers 402 coupled to a strut 404, which may be a unitary strut, as shown, or a double strut (not shown). The washer 402 has a set of protrusions 416 (e.g., jagged teeth) for engaging an external surface of the strut 404. The strut 404 may be a generally U-shaped strut including an interior channel 408, an opening (not shown) formed through an end wall 411, and a set of turned-in ends 412 at an open side thereof. It will be appreciated that the assembly 400 may include various strut configurations in different embodiments.

The assembly 400 further includes one or more fasteners 420 (e.g., a hex nut, a clamp, a hub assembly) for securing the washer 402 to the strut 404. Each fastener 420 has an opening 434 formed therein for receiving a support 424, such as a threaded rod or bolt. As shown, the support 424 extends through the washer 402 on one side of the strut 404, and terminates within the interior channel 408.

As shown, the washer 402 is clevis-shaped, and includes a flat central section 425 having a top surface 426, an inner surface 428, and a curved engagement surface 430 having the set of protrusions 416 formed thereon. The washer 402 further includes free ends 431 oriented perpendicular, or substantially perpendicular, to the central section 425. As shown, the washer 402 is shaped to fit around the exterior of the strut 404, thus adding additional stability and load capacity when used with the strut 404. To further enhance mechanical attachment of the washer 402 to the strut 404, the protrusions 416 are jagged teeth that extend from the inner surface 428 of the washer 402 and into the strut 404.

As further shown, the apparatus 400 includes a strut fitting 440 in abutment with the top surface 426 of the washer 402, wherein the strut fitting 440 is disposed between the washer 402 and the fastener 420 along a lengthwise axis A-A extending through the support 424. In exemplary embodiments, the strut fitting 440 couples a brace arm 442 to another brace member 444 (e.g., a strut), as shown in FIG. 4B. The strut fitting 440 may be one component of the brace arm 442, which is a pivotable connector coupled to the brace member 444 by a set of fasteners 445, such as bolts or screws. The strut fitting may include a cylindrical post 446, which permits rotation of the brace member 444 relative to the strut 404.

The apparatus 400 may further include a strut nut 450 disposed within the interior channel 408 of the strut 404 to engage the support 424 and clamp the strut fitting 440 and the washer 402 to the strut 404. In exemplary embodiments, the strut nut 450 includes an opening 452 formed therein for receiving the support 424. As shown, the strut nut 450 further includes a ridge or recess 453 configured to receive turned-in ends 412 of the strut 404. The strut nut 450 further includes a protrusion 454 adjacent the recesses 452, between the turn-in end 412 and an inner surface 455 of the strut 404. The recess 452 and the protrusion provide a mechanical connection with the turned-in ends 412 of the strut 404, thus adding additional stability and load capacity between the strut nut 450 and the strut 404.

Figure 5B:
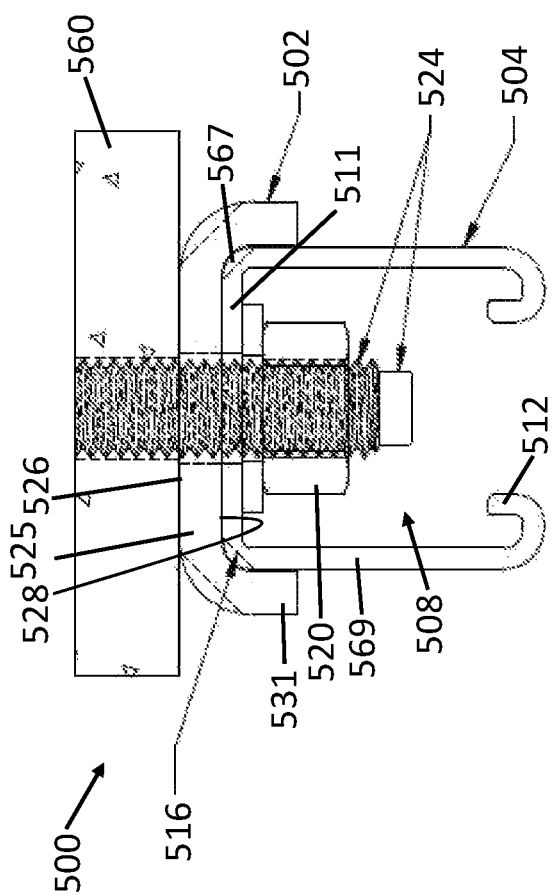

Turning now to FIGS. 5A-B, another assembly according to embodiments of the disclosure will be described in greater detail. In this embodiment, the assembly 500 may be used to secure a slotted strut 504 to a structure 560. The assembly 500 includes one or more washers 502 coupled to the strut 504, which may be a unitary strut, as shown, or a double strut (not shown). The washer 502 has a set of protrusions 516 (e.g., jagged teeth) for engaging an external surface of the strut 504. The strut 504 may be a generally U-shaped strut including an interior channel 408, an opening or slot 510 formed through an end wall 511, and a set of turned-in ends 512 at an open side thereof. It will be appreciated that the assembly 500 may include various strut configurations in different embodiments.

The assembly 500 further includes one or more fasteners 520 (e.g., a hex nut, a clamp, a hub assembly) for securing the washer 502 to the strut 504. Each fastener 520 has an opening formed therein for receiving a support 524, such as a threaded rod or bolt. As shown, the support 524 may extend from an interior of the structure 560, through the washer 502 and corresponding slot 510, and terminate within the interior channel 508.

In exemplary embodiments, the washer 502 is clevis-shaped, and includes a flat central section 525 having a top surface 526, an inner surface 528, and a curved engagement surface 530 having the set of protrusions 516 formed thereon. The curved engagement surface 530 generally conforms to a corner section 567 of the strut 505, i.e., the intersection of the end wall 511 and a sidewall 569. The washer 502 further includes free ends 531 oriented perpendicular, or substantially perpendicular, to the central section 525. As shown, the washer 502 is shaped to fit around the end wall 511 of the strut 504, thus adding additional stability and load capacity when the assembly 500 is torqued. The protrusions 516 may be jagged teeth that extend from the inner surface 528 of the washer 502 and into the end wall 511 of the strut 504 to enhance mechanical attachment. The fastener 520 further enhances this connection by applying a force to the support 524 and to a strut nut 550 around the support 524. The strut nut 550 is disposed within the interior channel 508 of the strut 504, between the fastener 520 and an underside of the end wall 511.

As will be appreciated, a number of advantages are provided by the embodiments of the present disclosure. Firstly, the toothed design does not engage with the geometry of the slot, which allows it to be positioned anywhere along the length of the slot. This is an improvement over existing designs in which the slot geometry allows only one fixed location for the hole.

In a second advantage, the clevis shaped body contacts three surfaces of the strut which prevents rotation, allows higher load capacity in certain loading scenarios, and spreads the contact load on the strut. This is an improvement over existing products that are flat and that only contact one surface of the strut, sometimes allowing rotation, and often resulting in a more concentrated load on the strut.

In a third advantage, the teeth penetrate the strut material and create a high capacity, slip-resistant connection. This is an improvement over existing products that rely on friction only, which is inherently weaker.

In a fourth advantage, when used with a channel nut, the additional teeth from the washer create a stronger connection by creating additional points of penetration and adding a load path.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

The invention claimed is:

1. An assembly, comprising:
   a washer coupled to a first side of a strut, the strut including an interior channel, an opening formed through an end wall, a set of turned-in ends, and an open side opposite the end wall, wherein the washer includes an engagement surface having a set of protrusions for engaging a surface of the strut;
   a second washer coupled to a second side of the strut, opposite the first side of the strut; and
   a support for securing the washer to the strut, the support extending through each of: the open side, the interior channel, and the opening formed through the end wall.

2. The assembly of claim 1, wherein the washer has a clevis shaped body comprising:
   a central section having a top surface;
   an inner surface opposite the top surface, the inner surface in contact with the strut;
   a curved engagement surface extending from the inner surface, wherein the set of protrusions is formed along the curved engagement surface; and a free end extending from the curved engagement surface, the free end oriented substantially perpendicular to the central section.

3. The assembly of claim 1, wherein the set of protrusions is a plurality of teeth extending from an inner surface of the washer.

4. The brace assembly of claim 3, wherein the fastener has an opening for receiving the support therein.

5. The assembly of claim 1, further comprising a strut fitting in abutment with a top surface of the washer.

6. The assembly of claim 5, the strut fitting disposed between a fastener and the washer.

7. The assembly of claim 1, further comprising a fastener for securing the washer to the strut, wherein the fastener has an opening for receiving the support therein.

8. The assembly of claim 1, wherein the support is one of a threaded rod or a bolt.

9. The assembly of claim 1, further comprising a strut nut engaged with the support and disposed within the interior channel.

10. The assembly of claim 1, wherein the washer is directly coupled to one of: the end wall, and the set of turned-in ends.

11. A brace assembly comprising:
a washer secured to a strut, the strut including an interior channel, an opening through an end wall, an open side opposite the end wall, and a set of turned-in ends, wherein the washer includes an engagement surface having a set of protrusions for engaging a surface of the strut;
a support for securing the washer to the strut, the support extending through each of: the open side, the interior channel, and the opening formed through the end wall;
a strut fitting disposed between a fastener and a top surface of the washer.

12. The brace assembly of claim 11, wherein the washer comprises:
a central section including the top surface, the top surface in contact with the fastener;
an inner surface opposite the top surface, the inner surface in contact with the strut;
a curved engagement surface extending from the inner surface, wherein the set of protrusions is formed along the curved engagement surface; and
a free end extending from the curved engagement surface, the free end oriented substantially perpendicular to the central section.

13. The brace assembly of claim 12, wherein the set of protrusions includes a plurality of teeth extending from the curved engagement surface.

14. The brace assembly of claim 11, further comprising a strut nut engaged with the support and disposed within the interior channel, wherein the strut nut includes a recess and a protrusion configured to receive the set of turned-in ends.

15. The brace assembly of claim 11, further comprising a plurality of washers, wherein a first washer of the plurality of washers is coupled to a first side of the strut, and a second washer of the plurality of washers is coupled to a second side of the strut, opposite the first side of the strut.

16. The brace assembly of claim 11, wherein the washer is directly coupled to one of: the end wall, and the set of turned-in ends.

17. A brace assembly comprising:
a washer secured to a strut, the strut including an interior channel, an opening formed through an end wall, an open side opposite the end wall, and a set of turned-in ends;
a fastener for securing the washer to the strut, the fastener having an opening for receiving a support therein, the support extending through each of: the open side, the interior channel, and the opening formed through the end wall, wherein the washer includes:
a central section having a top surface in contact with the fastener;
an inner surface opposite the top surface, the inner surface in contact with the strut;
a curved engagement surface extending from the inner surface, wherein a set of protrusions is formed along the curved engagement surface; and
a free end extending from the curved engagement surface, the free end oriented substantially perpendicular to the central section; and
a strut fitting disposed between the fastener and the top surface of the central section of the washer.

18. The assembly of claim 1, wherein the second washer is secured to the strut by the support.

* * * * *